US009485448B2

(12) United States Patent
Suh et al.

(10) Patent No.: US 9,485,448 B2
(45) Date of Patent: *Nov. 1, 2016

(54) METHOD FOR RECEIVING A BROADCAST SIGNAL AND BROADCAST RECEIVER

(75) Inventors: Jong Yeul Suh, Seoul (KR); Gomer Thomas, Arlington, WA (US); Jae Hyung Song, Seoul (KR); Jin Pil Kim, Seoul (KR); Ho Taek Hong, Seoul (KR); Joon Hui Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

This patent is subject to a terminal disclaimer.

(21) Appl. No.: 13/419,913

(22) Filed: Mar. 14, 2012

(65) Prior Publication Data

US 2012/0174176 A1 Jul. 5, 2012

Related U.S. Application Data

(63) Continuation of application No. 12/654,079, filed on Dec. 9, 2009, now Pat. No. 8,161,513.

(60) Provisional application No. 61/159,435, filed on Mar. 11, 2009, provisional application No. 61/153,973, filed on Feb. 20, 2009, provisional application No. 61/121,178, filed on Dec. 9, 2008, provisional application No. 61/138,494, filed on Dec. 17, 2008, provisional application No. 61/226,259, filed on Jul. 16, 2009.

(51) Int. Cl.
*H04N 7/10* (2006.01)
*H04N 7/025* (2006.01)
*H04N 5/44* (2011.01)
*H04N 21/434* (2011.01)
*H04N 21/462* (2011.01)
*H04N 21/61* (2011.01)
*H04N 21/643* (2011.01)
*H04N 21/81* (2011.01)

(52) U.S. Cl.
CPC ........ *H04N 5/4401* (2013.01); *H04N 21/4345* (2013.01); *H04N 21/4349* (2013.01); *H04N 21/4622* (2013.01); *H04N 21/6125* (2013.01); *H04N 21/64322* (2013.01); *H04N 21/812* (2013.01)

(58) Field of Classification Search
CPC .. H04H 40/90; H04N 21/235; H04N 21/435; H04N 5/4401; H04N 5/445
USPC ........... 725/9, 17, 20, 25, 28, 32, 35, 67–68, 725/701–71, 93, 116, 146, 70–71; 370/312, 370/432; 709/217, 227, 229; 348/731, 348/426.1, 384.1
See application file for complete search history.

(56) References Cited

U.S. PATENT DOCUMENTS

| | | |
|---|---|---|
| 2005/0166244 A1 | 7/2005 | Moon |
| 2007/0283408 A1 | 12/2007 | Lee |
| 2009/0025051 A1 | 1/2009 | Hong et al. |
| 2010/0075591 A1 | 3/2010 | Eyer et al. |
| 2010/0134701 A1 | 6/2010 | Eyer |
| 2010/0309387 A1 | 12/2010 | Eyer |
| 2011/0001885 A1 | 1/2011 | Eyer |
| 2011/0004908 A1 | 1/2011 | Eyer |
| 2011/0004910 A1 | 1/2011 | Eyer |

FOREIGN PATENT DOCUMENTS

| | | |
|---|---|---|
| WO | WO 2007/030590 | 3/2007 |
| WO | WO 2007/072138 | 6/2007 |

*Primary Examiner* — Jason Salce
(74) *Attorney, Agent, or Firm* — Dentons US LLP

(57) ABSTRACT

A method of receiving a broadcast signal including a Non-Real-Time (NRT) service and a broadcast receiver are disclosed herein. A method of receiving a broadcast signal including an NRT service, the method comprises receiving a broadcast signal including first signaling information and second signaling information, identifying the NRT service based on the first signaling information, parsing the second signaling information to identify an Internet Protocol (IP) address of an NRT service signaling channel, receiving the NRT service signaling channel by accessing the IP address, and downloading a desired NRT service based on the NRT service signaling channel.

10 Claims, 18 Drawing Sheets

FIG. 4

| Syntax | #. of Bits | Mnemonic |
|---|---|---|
| TS_program_map_secion(){ | | |
|   table_id | 8 | 0xC2 |
|   section_syntax_indicator | 1 | '1' |
|   0 | 1 | '0' |
|   reserved | 2 | '11' |
|   section_length | 12 | uimsbf |
|   program_number | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   reserved | 3 | '111' |
|   PCR_PID | 13 | uimsbf |
|   reserved | 4 | '1111' |
|   program_info_length | 12 | uimsbf |
|   for(i=0; i<N;i++){ | | |
|       descriptor() | | |
|   } | | |
|   for(i=0;i<N;i++){ | | |
|     stream_type | 8 | uimsbf |
|     reserved | 3 | '111' |
|     elementary_PID | 13 | uimsbf |
|     reserved | 4 | '1111' |
|     ES_info_length | 12 | uimsbf |
|     for(j=0; j< N2; j++) { | | |
|       ES_descriptor(); | | |
|     } | | |
|   } | | |
|   CRC32 | 32 | rpchof |
| } | | |

FIG. 5

| Syntax | No. of Bits | Format |
|---|---|---|
| virtual_channel_table_section(){ | | |
|   table_id | 8 | 0xC8 |
|   section_syntax_indicator | 1 | '1' |
|   Private_indicator | 1 | '1' |
|   reserved | 2 | '11' |
|   section_length | 12 | uimsbf |
|   table_id_extension | 16 | 010x0000 |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for(i=0;i<num_channels_in_section;i++){ | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for(i=0;i<N;i++){ | | |
|       descriptor() | | |
|     } | | |
|   } | | |
|   reserved | 6 | '111111' |
|   additional_descriptors_length | 10 | uimsbf |
|   for(j=0;j<N;j++){ | | |
|     additional_descriptor() | | |
|   } | | |
|   CRC_32 | 32 | rpchof |
| } | | |

FIG. 6

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 7

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 8

| Syntax | No.of Bits | Format |
|---|---|---|
| NRT_service_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_NRT_protocol_version | 8 | uimsbf |
|         ensemble_id | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_NRT_services | 8 | uimsbf |
|     for (j=0;j< num_NRT_services; j++) | | |
|     { | | |
|         NRT_service_id | 16 | uimsbf |
|         NRT_service_status | 2 | uimsbf |
|         SP_indicator | 1 | bslbf |
|         short_NRT_service_name_length /' m '/ | 3 | uimsbf |
|         short_NRT_service_name | 16*m | |
|         reserved | 2 | '11' |
|         NRT_service_category | 6 | uimsbf |
|         num_components | 5 | uimsbf |
|         IP_version_flag | 1 | bslbf |
|         source_IP_address_flag | 1 | bslbf |
|         NRT_service_destination_IP_address_flag | 1 | bslbf |
|         if (source_IP_address_flag) | | |
|             source_IP_address | 32 or 128 | uimsbf |
|         if (NRT_service_destination_IP_address_flag) | | |
|             NRT_service_destination_IP_address | 32 or 128 | uimsbf |
|         for (j=0;j< num_components; j++) | | |
|         { | | |
|             reserved | 1 | '1' |
|             essential_component_indicator | 1 | bslbf |
|             component_destination_IP_address_flag | 1 | bslbf |
|             port_num_count | 5 | uimsbf |
|             component_destination_UDP_port_num | 16 | uimsbf |
|             if (component_destination_IP_address_flag) | | |
|                 component_destination_IP_address | 32 or 128 | uimsbf |
|             reserved | 4 | '1111' |

FIG. 9

| | | |
|---|---|---|
| num_component_level_descriptors | 4 | uimsbf |
| for (k=0;k< num_components_level_descriptors; k++) { | | |
|     component_level_descriptor() | var | |
|   } | | |
| } | | |
| reserved | 4 | '1111' |
| num_NRT_service_level_descriptors | 4 | uimsbf |
| for (m=0; m<num_NRT_service_level_descriptors; m++) { | | |
|     NRT_service_level_descriptor() | var | |
|   } | | |
| } | | |
| reserved | 4 | '1111' |
| num_virtual_channel_level_descriptors | 4 | uimsbf |
| for (n=0; n<num_virtual_channel_level_descriptors; n++) { | | |
|     virtual_channel_level_descriptor() | var | |
|   } | | |
| } | | |

FIG. 10a

| Syntax | No. of Bits | Format |
|---|---|---|
| NRT_content_table_section() { | | |
|     table_id | 8 | 0xTBD |
|     section_syntax_indicator | 1 | '1' |
|     private_indicator | 1 | '1' |
|     reserved | 2 | '11' |
|     section_length | 12 | uimsbf |
|     service_id | 16 | uimsbf |
|     reserved | 2 | '11' |
|     NCT_version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     time_span_start | 32 | uimsbf |
|     reserved | 5 | '11111' |
|     time_span_length | 11 | uimsbf |
|     num_items_in_section | 8 | uimsbf |
|     for (j=0; j< num_items_in_section; j++) { | | |
|         content_linkage | 32 | uimsbf |
|         updates_available | 1 | bslbf |
|         reserved | 1 | '1' |
|         TF_available | 1 | bslbf |
|         low_latency | 1 | bslbf |
|         playback_length_in_seconds | 20 | uimsbf |
|         content_length_included | 1 | bslbf |
|         playback_delay_included | 1 | bslbf |
|         expiration_included | 1 | bslbf |
|         reserved | 1 | '1' |
|         duration | 12 | uimsbf |

FIG. 10b

| | | |
|---|---|---|
| if (content_length_included==1) { | | |
|     content_length | 40 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| content_name_length | 8 | uimsbf |
| content_name_text() | var | |
| reserved | 4 | '1111' |
| content_descriptors_length | 12 | uimsbf |
| for (i=0; i<N; i++) { | | |
|     content_descriptor() | | |
| } | | |
| } | | |
| reserved | 6 | '111111' |
| descriptors_length | 10 | uimsbf |
| for (i=0; i<M; i++) { | | |
|     descriptor() | | |
| } | | |
| } | | |

FIG. 13

| Syntax | No.of Bits | Format |
|---|---|---|
| NRT_IP_address_list_descriptor_A(){ | | |
|    descriptor_tag | 8 | 0 x TBD |
|    descriptor_length | 8 | uimsbf |
|    NRT_IP_address_version_flag | 1 | bslbf |
|    num_IP_address | 7 | uimsbf |
|    for (i=0; i< num_IP_adddress; i++){ | | |
|       if (NRT_IP_address_version_flag) | | |
|       NRT_IP_address | 32 or 128 | uimsbf |
|       NRT_UDP_port_number | 16 | uimsbf |
|    } | | |
| } | | |

FIG. 14

| Syntax | No.of Bits | Format |
|---|---|---|
| NRT_IP_address_list_descriptor_B() { | | |
|     descriptor_tag | 8 | 0xDB |
|     descriptor_length | 8 | uimsbf |
|     NRT_IP_address_version_flag | 1 | bslbf |
|     num_elements | 7 | uimsbf |
|     for (i=0; i< num_elements; i++){ | | |
|         reserved | 4 | bslbf |
|         elementary_PID | 13 | uimsbf |
|         num_IP_address | 7 | uimsbf |
|         for ( i=0;i< num_IP_address;i++){ | | |
|             if (NRT_IP_address_version_flag) | | |
|             NRT_IP_address | 32 or 128 | uimsbf |
|             NRT_UDP_port_number | 16 | uimsbf |

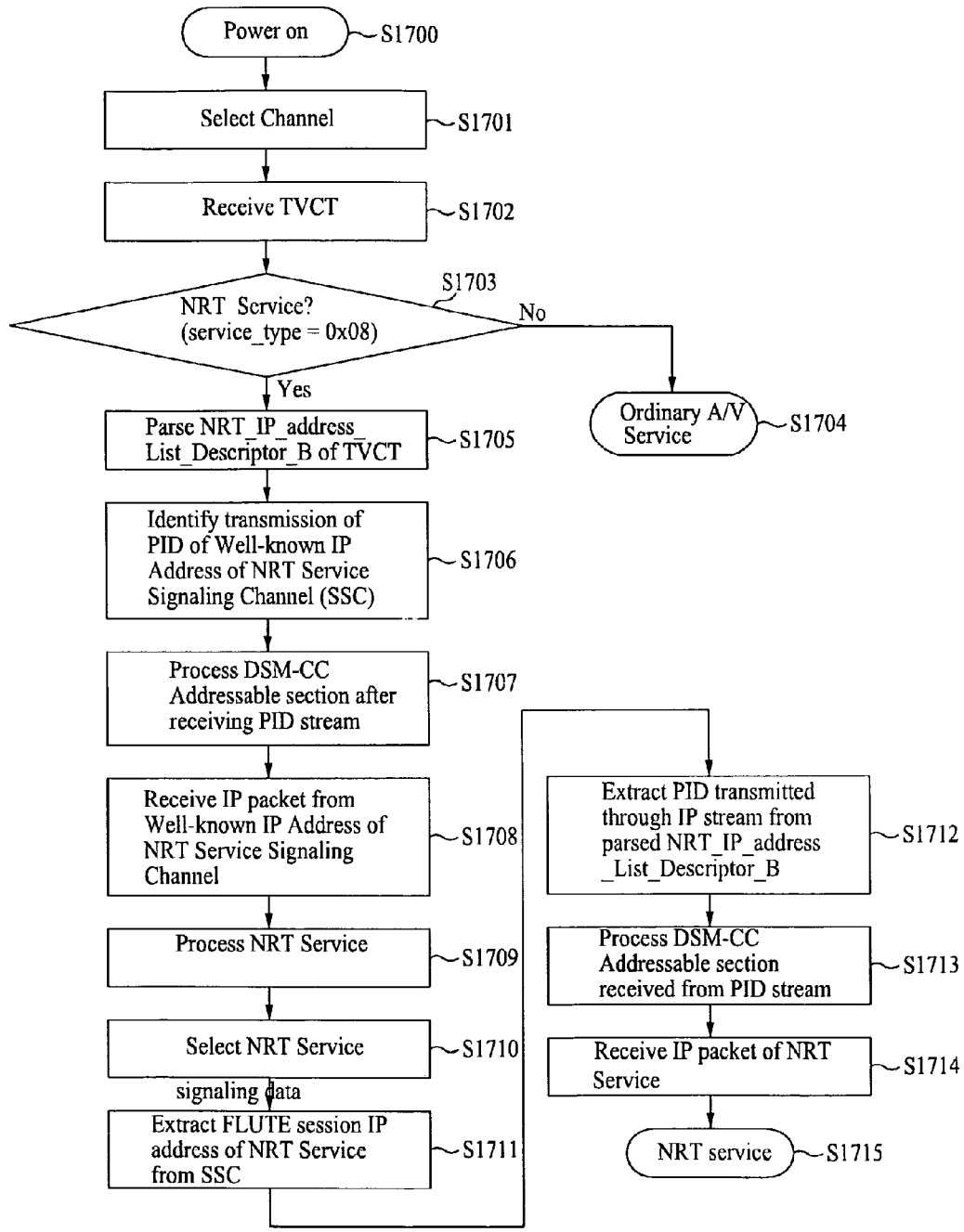

METHOD FOR RECEIVING A BROADCAST SIGNAL AND BROADCAST RECEIVER

This application is a Continuation of application Ser. No. 12/654,079, filed on Dec. 9, 2009 now U.S. Pat. No. 8,161,513 and claims the benefit of U.S. Provisional Application No. 61/159,435, filed on Mar. 11, 2009, which is hereby incorporated by reference. This application claims the benefit of U.S. Provisional Application No. 61/153,973, filed on Feb. 20, 2009, which is hereby incorporated by reference. This application claims the benefit of U.S. Provisional Application No. 61/121,178, filed on Dec. 9, 2008, which is hereby incorporated by reference. This application claims the benefit of U.S. Provisional Application No. 61/138,494, filed on Dec. 17, 2008, which is hereby incorporated by reference. This application claims the benefit of U.S. Provisional Application No. 61/226,259, filed on Jul. 16, 2009, which is hereby incorporated by reference.

BACKGROUND OF THE INVENTION

1. Field of the Invention

The present invention relates to a signaling method for a service transmitted by Non-Real-Time (hereinafter abbreviated NRT) and more particularly, to a broadcast receiver and a method of receiving a broadcast signal including an NRT service.

2. Discussion of the Related Art

A Non-Real-Time (NRT) service is one of the most powerful applications that will be utilized for future Digital Television (DTV) services. The NRT is accompanied by a non-real-time transmission (not real-time streaming), storage, and viewing operations. The NRT transmits a content of a file type on a surplus bandwidth via a broadcast medium such as terrestrial and the like. And, it is expected that the NRT will be implemented in various kinds of service functions including push VOD, targeted advertising and the like.

SUMMARY OF THE INVENTION

Accordingly, the present invention is directed to a method of receiving a broadcast signal in a broadcast receiver that substantially obviates one or more problems due to limitations and disadvantages of the related art.

An object of the present invention is to provide a method of receiving a broadcast signaling including a Non-Real-Time (NRT) service, wherein receiving a broadcast signal including first signaling information and second signaling information, identifying the NRT service based on the first signaling information, parsing the second signaling information to identify an IP address of an NRT service signaling channel, receiving the NRT service signaling channel by accessing the IP address, and downloading a desired NRT service based on the NRT service signaling channel.

Another object of the present invention is to provide a broadcast receiver for receiving a broadcast signal including a Non-Real-Time (NRT) service, wherein a baseband processor for receiving first signal information and second signaling information, a PSI/PSIP section parser for identifying the NRT service based on the first signaling information, a service signaling section parser for parsing the second signaling information, a Service Manager for identifying an IP address of an NRT service signaling channel, and an NRT service manager for identifying a desired NRT service based on the NRT service signaling channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 4 is a bit-stream syntax of a Program Map Table (PMT) section to identify an NRT application configured according to an embodiment of the present invention;

FIG. 5 is a diagram for a bit-stream section of a Terrestrial Virtual Channel Table (TVCT) section configured according to an embodiment of the present invention;

FIG. 6 is an exemplary diagram of an Advanced Television Systems Committee (ATSC) service type according to the present invention;

FIG. 7 is an another exemplary diagram of an ATSC service type according to the present invention;

FIGS. 8 and 9 are a diagram for a bit-stream syntax of Non-Real-Time Service Table (NST) extracted by a receiver from a received MPEG-2 TS configured according to an embodiment of the present invention;

FIGS. 10A and 10B are a diagram for a bit-stream syntax of an Non-Real-Time Content Table (NCT) section configured according to an embodiment of the present invention;

FIG. 13 is a diagram for a bit-stream syntax of NRT_I-P_address_list_descriptor_A configured according to an embodiment of the present invention;

FIG. 14 is a diagram for a bit-stream syntax of NRT_I-P_address_list_descriptor_B configured according to an embodiment of the present invention;

FIG. 17 is a flowchart to explain a process for processing an NRT service in a receiver according to another embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Terminologies used for the present invention are selected from general terminologies, which are currently and widely used, in consideration of the functions in the present invention but may vary according to intentions of a person having an ordinary knowledge in the technical field, practices or the advent of new technology, etc. In specific case, a terminology may be arbitrarily chosen by the applicant(s). In such case, its detailed meaning shall be described in the Detailed Description of the Invention. Therefore, the terminology used for the present invention needs to be defined based on the intrinsic meaning of the terminology and the contents across the present invention instead of a simple name of the terminology.

Figure 1:
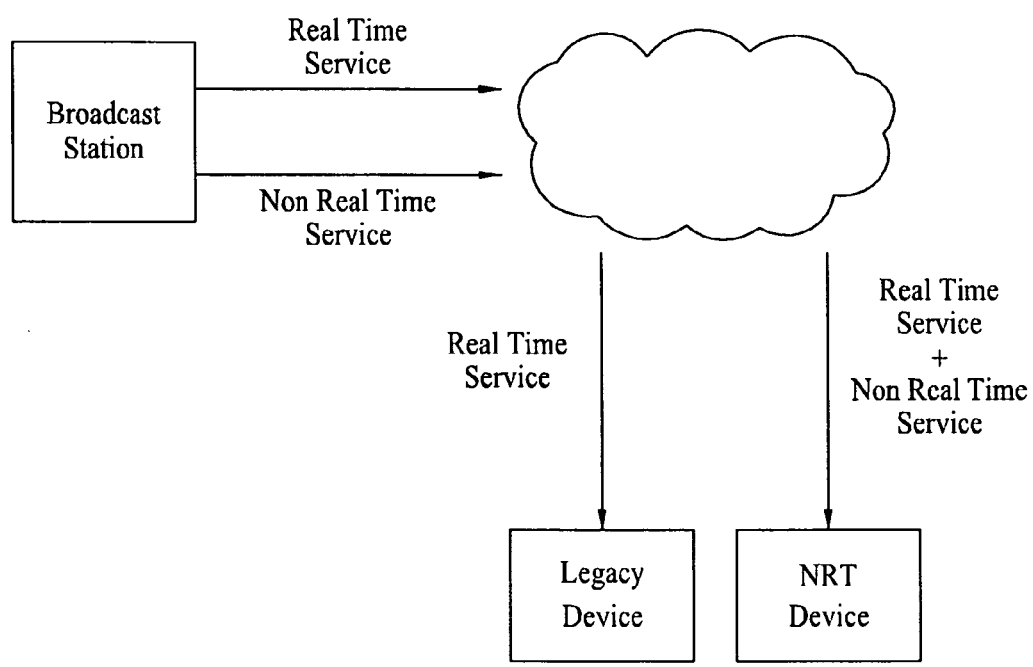
FIG. 1 is an exemplary conceptual diagram of an NRT service.

FIG. 1. is an exemplary conceptual diagram of an NRT service.

A broadcasting station transmits a real-time (hereinafter abbreviated RT) service according to a conventional method. In doing so, the broadcasting station transmits the RT service or the Non-Real-Time (NRT) service using a bandwidth left in the due course. In such case, the NRT service can contain a movie, news clip, weather information, advertisements, and contents for Push Video on Demand (VOD), and the like.

A legacy device has the principle that the operation is not affected by an NRT stream included within a channel. However, a DTV receiver, a related art, has a problem in receiving and processing the NRT service provided by a broadcasting station properly because of not having a means for processing unit for the NRT service.

On the contrary, a broadcast receiver according to the present invention, an NRT device is able to properly receive and process an NRT service combined with an RT service, thereby providing a viewer with more various functions than those of the related art DTV.

In this case, the RT service and the NRT service are transmitted on the same DTV channel or different DTV channels and are transmitted through an MPEG-2 transport packet (TP) or an internet protocol (IP) datagram. Hence, a receiver needs to identify the two kinds of services transmitted on the same or different channel. A method of defining and providing signaling information to enable a receiver to receive and process an NRT service is described. The broadcasting station provides signaling information of at least one unique packet identifier (PID) for identifying an NRT service.

Figure 2:
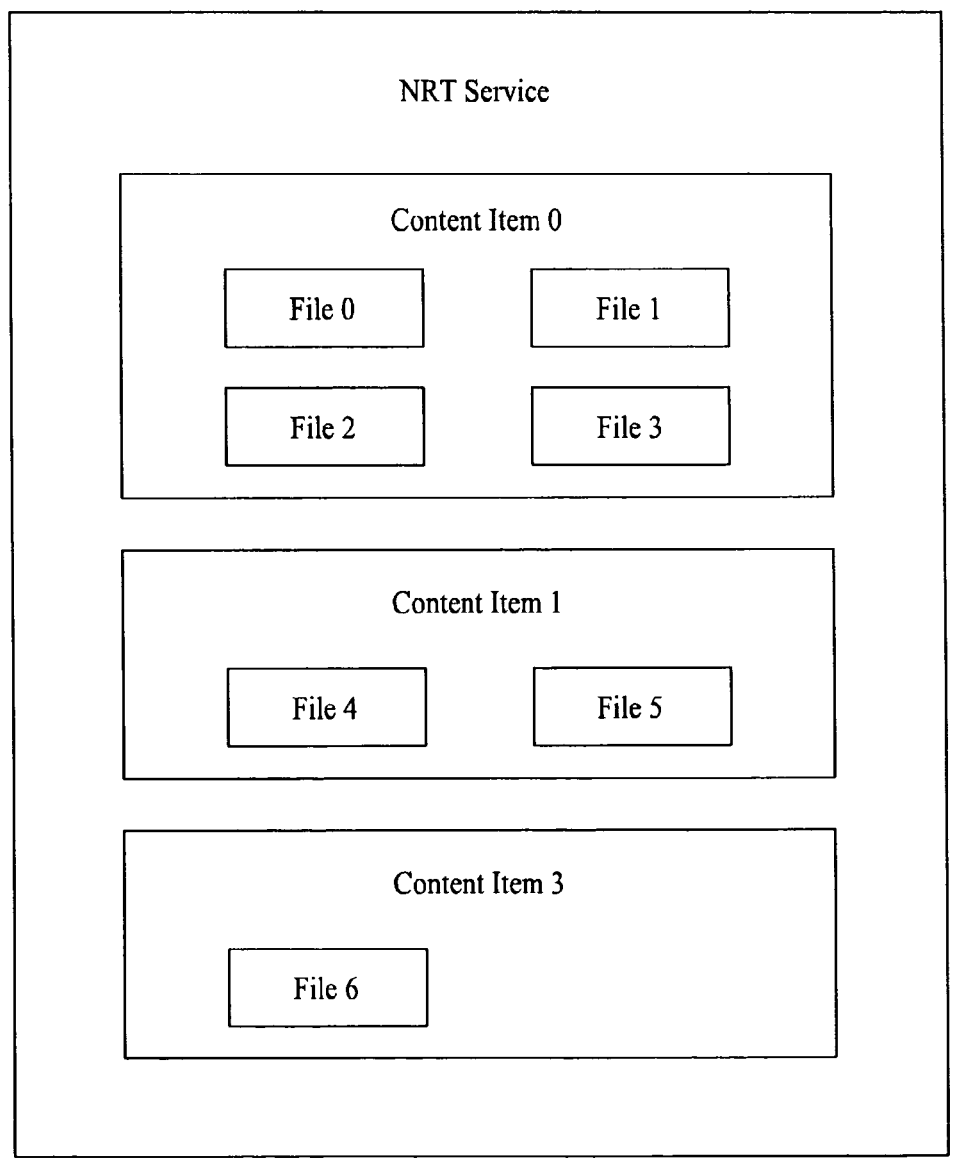
FIG. 2 is an exemplary diagram explaining relations between an NRT service, content items and files.

FIG. 2 is an exemplary diagram explaining relations between an NRT service, content items and files.

Referring to FIG. 2, an NRT service can include one or more content items. And, each of the content items can include one or more files. And, each of the content items is an independent entity and may correspond to a program or an event in a real time broadcast. Therefore, the NRT service can be defined as a group that is able to service in combination of the above content items.

In order for a receiver to properly process the above NRT service, signaling for the corresponding NRT service is required. The present invention intends to properly process an NRT service received by a receiver by defining and providing the signaling information. The details of the signaling information shall be described in the description of the corresponding part.

NRT services can be mainly categorized into a fixed NRT service and a mobile NRT service. In the following description, the fixed NRT service is taken as an example for an embodiment of the present invention. As shown in FIG. 2, an NRT service may include one or more contents and the contents can have one or more files associated with the contents.

Figure 3:
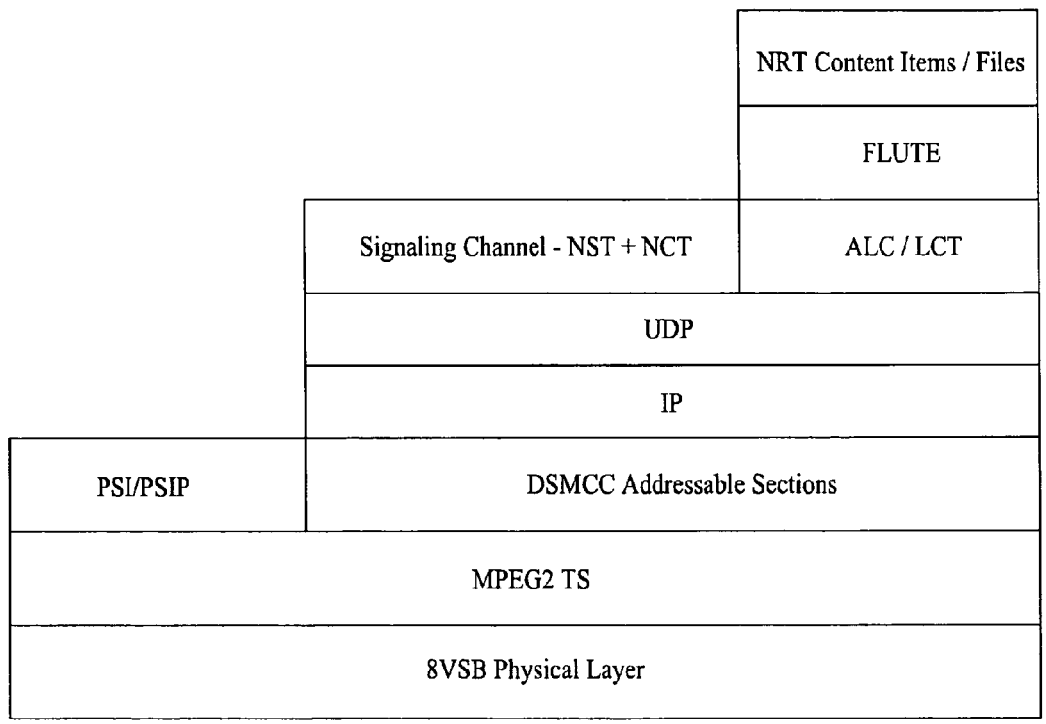
FIG. 3 is a diagram for a protocol stack of a fixed NRT service configured according to an embodiment of the present invention.

FIG. 3 is a diagram for a protocol stack of a fixed NRT service configured according to an embodiment of the present invention.

Referring to FIG. 3, a protocol stack for providing a fixed NRT service transmitting NRT content items and/or files is illustrated. The IP datagram includes NRT content items and/or files and signaling channel for providing NST and NCT. Program and Specific Information/Program and System Information Protocol (PSI/PSIP) data is delivered through an MPEG-2 TS format.

In FIG. 3, the fixed NRT service is packetized according to User Datagram Protocol (UDP) in an IP layer. The UDP packet becomes UDP/IP packet data by being packetized again according to an IP scheme. In this disclosure, the packetized UDP/IP packet data is referred to as an IP datagram.

The NRT content items/files are packetized according to File Delivery over Unidirectional Transport (FLUTE) scheme or Asynchronous Layered Coding/Layered Coding Transport (ALC/LCT) scheme. The ALC/LCT packet is transported by being encapsulated in a UDP datagram. The ALC/LCT/UDP packet is packetized into ALC/LCT/UDP/IP packet according to IP datagram scheme to become an IP datagram. This IP datagram is contained in MPEG-2 TS through DSM-CC addressable sections for transport. In this case, the ALC/LCT/UDP/IP packet is the information on FLUTE session and includes a File Delivery Table (FDT) as well.

A signaling information channel including an NST and an NCT is packetized according to a UDP scheme. This UDP packet is packetized according to an IP scheme again to become UDP/IP packet data, IP datagram. This IP datagram is also contained in the MPEG-2 TS through the DSM-CC addressable sections for transport.

And, a PSI/PSIP table is separately defined and contained in the MPEG-2 TS. The PSI/PSIP data includes signaling information (TVCT) for identifying an NRT.

The MPEG-2 TS containing the above described NRT content items/files, signaling information channel and PSI/PSIP data therein are transferred by being modulated by a predetermined transmission scheme such as VSB transmission scheme.

FIG. 4 is a diagram for a bit-stream syntax of a MPEG-2 TS Program Map Table (PMT) section configured according to an embodiment of the present invention.

A table_id field is an 8-bit unsigned integer that shall identify the table section as the Program Map Table.

A section_syntax_indicator is a 1-bit field which indicates the section is formatted in MPEG "long-form" syntax.

A '0' (1-bit) is a field where MPEG-2 Systems defines this bit as 0b for the TS_program_map_section( ).

A section_length is a 12-bit unsigned integer that specifies the length, in bytes, of data following the section length field itself to the end of this table section.

A program_number is a 16-bit filed that ties this instance of the PMT with the corresponding MPEG-2 program listed in the PAT.

A version_number is a 5-bit field which reflects the version of a table section, and is incremented by one (modulo 32) when anything in the table changes.

A current_next_indicator is a 1-bit field which indicates whether the table section is currently applicable (value 1) or is the next one to be applicable (value 0).

A section_number is an 8-bit field that must be set to zero for the PMT, as it is not allowed for an instance of the PMT to exceed a total of 1024 bytes in length.

A last_section_number is an 8-bit field which must be set to zero.

A PCR_PID is a 13-bit field which identifies the PID of TS packets which carry the Program Clock Reference values for this program.

A program_info_length is a 12-bit field which gives the number of bytes taken up by the program information descriptors directly following the field.

A descriptor( ) field includes a descriptor, of type-length-data format, giving some information pertinent to the program as a whole.

A stream_type is an 8-bit field which indicates the type of ES being described in this iteration of the program element "for" loop. Receiving devices use stream_type to determine what kind of decoder is needed to process this stream. When the value of stream_type in the PMT section is '0x0D,' it indicates DSM-CC sections containing ATSC A/90 asynchronous data which refers to asynchronous carousel scenario of the DSM-CC download protocol encapsulated in DSM-CC sections.

An elementary_PID is a 13-bit filed which is the PID value of the TS packets carrying the program element being described in this iteration of the "for" loop.

An ES_info_length is a 12-bit field which indicates the total length of the ES info descriptors loop to follow. The two most-significant bits must be set to zero.

An ES_descriptor( ) includes a descriptor, of type-length-data format, giving some information pertinent to this program element. An NRT_IP_address_list_descriptor is one of the descriptor in this ES_descriptor, which includes the IP address and UDP port number of an NRT service. The detailed explanation will be discussed below with FIG. 11 and FIG. 13.

A CRC_32 is a 32-bit CRC value that gives a zero result in the registers after processing the PMT session.

FIG. 5 is a diagram for a bit-stream section of a Terrestrial Virtual Channel Table (TVCT) section configured according to an embodiment of the present invention.

Referring to FIG. 5, a Terrestrial Virtual Channel Table (TVCT) section is described as having a table format similar to that of an MPEG-2 private section. However, this is merely exemplary, and the present invention will not be limited to the examples given herein.

The TVCT can be divided into a header, a body and a trailer. The header part ranges from table_id field to protocol_version field. And, transport_stream_id field is a 16-bit field and indicates an MPEG-2 TSID within a Program Association Table (PAT) defined by a PID value of '0' for multiplexing. In the body part, num_channels_in_section field is an 8-bit field and indicates the number of virtual channels within a VCT section. Finally, the trailer part includes CRC_32 field.

First of all, the header part is explained as follows.

A table_id field is an 8-bit unsigned integer number that indicates the type of table section being defined herein. For the terrestrial_virtual_channel_table_section( ), the table_id shall be '0xC8'.

A section_syntax_indicator is a one-bit field which shall be set to '1' for the terrestrial_virtual_channel_table_section( ).

A private_indicator field (1-bit) shall be set to '1'.

A section_length is a twelve bit field, the first two bits of which shall be '00'. This field specifies the number of bytes of the section, starting immediately following the section_length field, and including the CRC. The value in this field shall not exceed 1021.

A table_id_extension field is set to '0x000'.

A version_number field (5-bit) represents the version number of the VCT.

A current_next_indicator is a one-bit indicator, which when set to '1' indicates that the VCT sent is currently applicable.

A section_number field (8 bit) gives the number of this section. The section_number of the first section in the TVCT shall be '0x00'.

A last_section_number field (8 bit) specifies the number of the last section (that is, the section with the highest section_number) of the complete TVCT.

A protocol_version is an 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.

The body part is explained as follows.

A num_channels_in_section field (8-bit) specifies the number of virtual channels in this VCT section. The number is limited by the section length.

A short_name field represents the name of the virtual channel, represented as a sequence of one to seven 16-bit code values.

A major_channel_number field is a 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel.

A minor_channel_number field is a 10-bit number in the range '0' to '999' that represents the "minor" or "sub"-channel number. This field, together with major_channel_number, performs as a two-part channel number, where minor_channel_number represents the second or right-hand part of the number. When the service_type is analog television, minor_channel_number shall be set to '0'. Services whose service_type is either ATSC_digital_television or ATSC_audio_only shall use minor numbers between '1' and '99'. The value of minor_channel_number shall be set such that in no case is a major_channel_number/minor_channel_number pair duplicated within the TVCT.

A modulation_mode field is an 8-bit unsigned integer number that indicates the modulation mode for the transmitted carrier associated with this virtual channel.

A carrier_frequency field includes the recommended value for these 32 bits is zero. Use of this field to identify carrier frequency is allowed, but is deprecated.

A channel_TSID is a 16-bit unsigned integer field in the range '0x0000' to '0xFFFF' that represents the MPEG-2 TSID associated with the TS carrying the MPEG-2 program referenced by this virtual channel.

A program_number field is a 16-bit unsigned integer number that associates the virtual channel being defined here with the MPEG-2 PROGRAM ASSOCIATION and TS PROGRAM MAP tables. For virtual channels representing analog services, a value of '0xFFFF' shall be specified for program_number.

An ETM_location is 2-bit field specifies the existence and the location of an Extended Text Message (ETM).

An access_controlled is a 1-bit Boolean flag that indicates, when set, that the events associated with this virtual channel may be access controlled. When the flag is set to '0', event access is not restricted.

A hidden is a 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.

A hide_guide is a Boolean flag that indicates, when set to '0' for a hidden channel that the virtual channel and its events may appear in EPG displays. This bit shall be ignored for channels which do not have the hidden bit set, so that non-hidden channels and their events may always be included in EPG displays regardless of the state of the hide_guide bit. Typical applications for hidden channels with the hide_guide bit set to '1' are test signals and services accessible through application-level pointers.

A service_type is a 6-bit enumerated type field that shall identify the type of service carried in this virtual channel. As one embodiment of the present invention, a service_type of a value '0x04' as indicated in FIG. 6, means that it is a ATSC_data_only_service and through the virtual channel, NRT service is being transmitted. In another embodiment of the present invention, if the service_type value is '0x08' as indicated in FIG. 7, meaning that it is ATSC_nrt_service and that the virtual channel carries an NRT service conforming to ATSC standards.

A source_id field (16-bit) represents a programming source associated with a virtual channel.

A descriptors_length field is total length (in bytes) of the descriptors for this virtual channel that follows.

A descriptor( ) field includes zero or more descriptors, as appropriate, may be included. An NRT_IP_address_list_descriptor is one of the descriptor in this descriptor which includes the IP address and UDP port number of an NRT service. The detailed explanation will be discussed below with detailed description of FIG. 12 and FIG. 14.

An additional_descriptors_length field is total length (in bytes) of the VCT descriptor list that follows.

The trailor part is explained as follows. CRC_32 is a 32-bit field that contains the cyclic redundancy check (CRC) value that ensures a zero output from the registers in the decoder.

NRT content is transferred through IP mechanism. In order to transfer IP datagram through a digital broadcast stream, ATSC has regulated ATSC A/90 and A/92 specifications.

FIGS. 8 and 9 are an exemplary diagram for a bit-stream syntax of Non-Real-Time Service Table (NST) configured according to an embodiment of the present invention.

NST describes service information and IP access information within a virtual channel carrying the NST. The NST also provides NRT broadcast stream information of a corresponding service using NRT_service_id as an identifier of an NRT broadcast stream to which each service belongs. And, NST according to the present embodiment includes description information of each fixed NRT service within one virtual channel. And, other side information can be included in a descriptor region.

In this case, although a corresponding syntax is written as an MPEG-2 private section to help the understanding, a format of corresponding data can have any type. For instance, SDP( ) is used to perform signaling via a Session Announcement Protocol (SAP).

A table_id field is an 8-bit unsigned integer number that indicates the type of table section being defined in NST.

A section_syntax_indicator field (1-bit) shall be set to '0' to always indicate that this table is derived from the short form of the MPEG-2 private section table.

A private_indicator field (1-bit) shall be set to '1'.

A section_length field (12-bit) specifies the number of remaining bytes this table section immediately following this field. The value in this field shall not exceed 4093 ('0xFFD').

A table_id_extension field (16-bit) is table-dependent. It shall be considered to be logically part of the table_id field providing the scope for the remaining fields. Herein, the table_id_extension field includes an NST_protocol_version field.

The NST_protocol_version is an 8-bit unsigned integer field whose function is to allow, in the future, this NRT Service Table to carry parameters that may be structured differently than those defined in the current protocol. At present, the value for the NST_protocol_version shall be zero. Non-zero values of NST_protocol_version may be used by a future version of this standard to indicate structurally different tables.

A version_number field (5-bit) represents a version number of the NST.

A current_next_indicator is a one-bit indicator, which when set to '1' shall indicate that the NRT Service Table sent is currently applicable. When the bit is set to '0', it shall indicate that the table sent is not yet applicable and will be the next table to become valid. This standard imposes no requirement that next tables (those with current_next_indicator set to '0') must be sent. An update to the currently applicable table shall be signaled by incrementing the version_number field.

A section_number field (8-bit) shall give the section number of this NRT Service table section. The section_number of the first section in an NRT Service table shall be '0x00'. The section_number shall be incremented by 1 with each additional section in the NRT Service table.

A last_section_number field (8-bit) shall give the number of the last section (the section with the highest section_number) of the NRT Service table of which this section is a part.

A num_NRT_services field (8-bit) specifies the number of NRT services in this NST section.

According to an embodiment of the present invention, an NST provides information for a plurality of fixed NRT services using a 'for' loop. Field information which is included in each fixed NRT service is explained as follows.

An NRT_service_id is a 16-bit unsigned integer number that shall uniquely identify this NRT Service within the scope of this NRT Broadcast. The NRT_service_id of a service shall not change throughout the life of the service. To avoid confusion, it is recommended that if a service is terminated, then the NRT_service_id for the service should not be used for another service until after a suitable interval of time has elapsed.

An NRT_service_status is a 2-bit enumerated field that shall identify the status of this NRT Service. The most significant bit shall indicate whether this NRT Service is active (when set to '1') or inactive (when set to '0') and the least significant bit shall indicate whether this NRT service is hidden (when set to '1') or not (when set to '0'). Hidden services are normally used for proprietary applications, and ordinary receiving devices should ignore them.

A SP_indicator is a 1-bit field that shall indicate, when set, that service protection is applied to at least one of the components needed to provide a meaningful presentation of this NRT Service.

A short_NRT_service_name_length is a three-bit unsigned integer that shall indicate the number of byte pairs in the short_NRT_service_name field. This value is shown as 'm' in the No. of Bits column for the short_NRT_service_name field. When there is no short name of this NRT service, the value of this field shall be '0'.

A short_NRT_service_name field is a short name of the NRT Service. When there is no short name of this NRT Service, this field shall be filled with NULLs ('0x00').

An NRT_service_category is a 6-bit enumerated type field that shall identify the type of service carried in this IP Service.

A num_components field (5-bit) specifies the number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of 1 for this field is reserved for possible future indication that source_IP_address, NRT_service_destination_IP_address, and component_destination_IP_address fields are for IPv6.

A source_IP_address_flag is a 1-bit Boolean flag that shall indicate, when set, that a source IP address value for this NRT Service is present to indicate a source specific multicast.

An NRT_service_destination_IP_address_flag is a 1-bit Boolean flag that indicates, when set to '1', that an NRT_service_destination_IP_address value is present, to serve as the default IP address for the components of this NRT Service.

A source_IP_address field shall be present if the source_IP_address_flag is set to '1' and shall not be present if the source_IP_address_flag is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field shall be present if the NRT_service_destination_IP_address_flag is set to '1' and shall not be present if the NRT_service_destination_IP_address_flag is set to '0'. If this NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

An essential_component_indicator is a one-bit indicator which, when set to '1', shall indicate that this component is an essential component for the NRT Service. Otherwise, this field indicates that this component is an optional component.

A port_num_count field shall indicate the number of destination UDP ports associated with this UDP/IP stream component. The values of the destination UDP port numbers shall start from the component_destination_UDP_port_num field and shall be incremented by one.

A component_destination_IP_address_flag is a 1-bit Boolean flag that shall indicate, when set to '1', that the component_destination_IP_address is present for this component.

A component_destination_IP_address field shall be present if the component_destination_IP_address_flag is set to '1' and shall not be present if the component_destination_IP_address_flag is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num is a 16-bit unsigned integer field that represents the destination UDP port number for this UDP/IP stream component.

A num_component_level_descriptors is a 16-bit unsigned integer field, that represents the number of descriptors providing additional information for IP stream component, may be included.

A component_level_descriptors field includes one or more descriptors providing additional information for this IP stream component, may be included.

A num_NRT_service_level_descriptors field (4 bit) specifies the number of NRT service level descriptors for this service.

An NRT_service_level_descriptor( ) field includes zero or more descriptors providing additional information for this NRT Service, may be included. This detailed service type can include a portal service for providing web contents, Push VOD, A/V download or the like.

A num_virtual_channel_level_descriptors field (4-bit) specifies the number of virtual channel level descriptors for this virtual channel.

A virtual_channel_level_descriptor( ) includes zero or more descriptors providing additional information for the virtual channel which this NST describes, may be included.

FIGS. 10A and 10B are diagrams of a bit-stream syntax of an NRT Content Table (NCT) section configured according to an embodiment of the present invention.

In the following description, explained is NCT associated with signaling/announcement of NRT content.

The information provided in the NCT includes the title of the content (for example, the name of the program available for download), the times during which the content is to be made available for download, and information such as content advisories, availability of caption services, content identification, and other metadata. One item of content may consist of one or more files. For example, an audio/video clip may come with a JPEG thumbnail image that can be used to represent it in on-screen displays. The NCT is used to provide information for virtual channels of service_type values 0x08.

An instance of the NCT can include data corresponding to an arbitrarily defined time period, or can describe NRT content starting at a specified time and into the indefinite future. Each NCT instance indicates the start time of the period it covers and the length of the period it covers (which may be indefinite). Each NCT instance may be segmented into as many as 256 sections. One section may contain information for multiple content items, but the information for any given content item shall not be segmented and put into two or more sections.

Any content item to be made available for download for a time interval that extends beyond the time period covered one or more NCT instances shall be described only in the first of these NCTs. Content item descriptions are placed within the NRT_content_table_section( ) in the order of their first availability. Therefore, when last_section_number is greater than zero (meaning the NCT is delivered in multiple sections), for sections other than the first (sections for which the value of section_number is greater than zero), all the content item descriptions within a given section shall have first availability times that are greater than or equal to all first availability times of content item descriptions in the immediately preceding section (the section whose value of section_number is one lower than the given section).

Each NCT identifies NRT services associated with the given value of service_id available on a particular virtual channel sometime during the time period it covers.

A table_id field (8-bit) is set to 0xTBD to identify this table section as belonging to the NCT.

A service_id field (16-bit) specifies the service_id field associated with the NRT service offering content items described in this section.

A NCT_version_number field (5-bit) indicates the version number of this NCT instance, where NCT instance is defined as the set of one or more NRT_content_table_section( ) having common values for service_id field, current_next_indicator field, protocol_version field, and time_span_start field. The version number is incremented by 1 modulo 32 when any field in the NCT instance changes.

A current_next_indicator (1-bit) field is always set to '1' for NCT sections; the NCT sent is always currently applicable.

A protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables.

A time_span_start field (32-bit) represents the start of the time span covered by this instance of the NCT, expressed as the number of GPS seconds since 00:00:00 UTC, Jan. 6, 1980. The time of day of time_span_start field is aligned to minute 00 of the hour. The value zero for time_span_start field indicates the time period covered by this NCT instance began in the indefinite past. The value of time_span_start field is the same for each section of a multi-sectioned NCT instance. The values of time_span_start field and time_span_ length field are set such that the specified time span does not overlap with any other NCT instance in this IP subnet.

A time_span_length field (11-bit) indicates the number of minutes, starting at the time indicated by time_span_start field, covered by this instance of the NCT. Once established, the value of time_span_length field for a given value of time_span_start field does not change. A value of time_span_ length field of zero means this NCT instance covers all time starting at time_span_start field into the indefinite future. If the value of time_span_start is zero, time_span_length field has no meaning. The value of time_span_length field is the same for each section of a multi-sectioned NCT instance. The values of time_span_start field and time_span length field are set such that the specified time span does not overlap with any other NCT instance in this IP subnet.

A num_items_in_section field (8-bit) indicates the number of content items described in this NCT section.

A content_linkage field (32-bit) in the range 0x0001 to 0xFFFFFFFF specifies the identification number of the content (or content item) described. Value 0x0000 is not used. The content_linkage field performs two linkage functions: it links metadata in the NCT to one or more files in the FLUTE FDT associated with this NRT service; it also forms the TF_id field (identifier for Text Fragment in Text Fragment Table). The value of the content_linkage field corresponds to either the value of one of the FDT-Content-Linkage elements or the value of one of the File-Content-Linkage elements in the FLUTE FDT for each file associated with the content item. The precedence rules may be applied when matching each content_linkage value with the corresponding content linkage elements in the FLUTE FDT.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

A low_latency field is Boolean flag, this field specifies, when set to '1,' that the content is available within the current digital transport with a low enough latency that its retrieval should be attempted while the user waits. When the field is set to '0', retrieval latency is longer and the user interface should suggest to the user to return later for viewing.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A content_length_included field is Boolean flag, this field indicates, when set to '1,' that the content_length field is present in this iteration of the "for" loop. Setting this field to '0' indicates the content_length field is not present in this iteration of the "for" loop.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content length field (40-bit), when present, represents the total size in bytes of the content item or items. This item is used by the broadcast receiver to determine if enough memory is available to store it before downloading is attempted.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field (32-bit) represents the expiration time of the content, expressed as the number of GPS seconds since 00:00:00 UTC, Jan. 6, 1980. Following expiration, the content is deleted from memory. If an expiration time is not specified, broadcast receivers are expected to use methods of their own choosing to manage memory resources.

A content_name_length field (8-bit) specifies the length (in bytes) of the content_name_text( ).

A content_name_text( ) field specifies the content item title in the format of a multiple string structure.

A content descriptors_length field (12-bit) indicates the total length (in bytes) of the content_descriptor( ) that provide additional information about the content level.

A content_descriptor( ) is separately applied to each content item.

A descriptors_length field (10-bit) indicates the total length (in bytes) of the descriptor( ).

A descriptor( ) is commonly applied to all content items described in the current NCT section.

Figure 11:
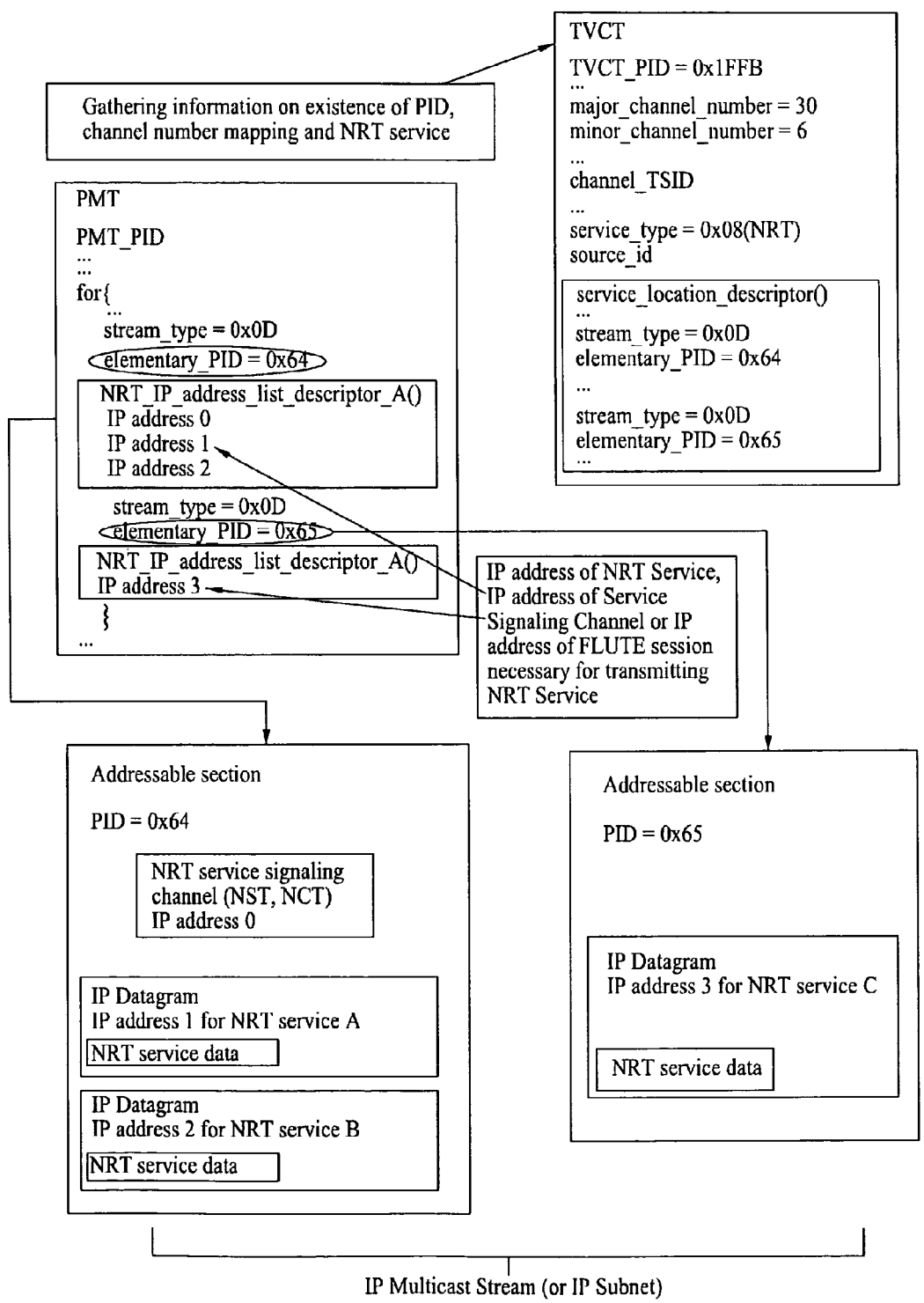
FIG. 11 is a diagram for an NRT service signaling structure configured according to an embodiment of the present invention.

FIG. 11 illustrates the NRT structure configured to an embodiment of the present invention.

First of all, the TVCT is needed to identify the channel number, which includes the major channel and minor channel. Also, the TVCT further identifies whether the service type is NRT service or not, and by having the value '0x08' as its service_type, it means that it is an NRT service.

Next, through the NRT_IP_address_list_descriptor_A( ) included in the PMT, the PID of the IP address of the transmission of the NRT service signaling channel or the NRT service is provided.

The NRT service signaling channel is transmitted through a well-known IP address/UDP port number and the NRT service is transmitted through a specific IP address/UDP port number. The NRT service signaling channel and the NRT service is packetized in MPEG-2 TS format for broadcast channel transmission. Therefore, through the NRT_IP_address_list_descriptor_A( ) in the PMT, the signaling of the PID information of the IP address of the NRT service signaling channel and the NRT service is achieved.

As illustrated in FIG. 11, the elementary_PID having the value of '0x64' includes IP address 0, 1, and 2 in the NRT_IP_address_descriptor_A( ). The IP address 0 indicates that it is a well-known IP address/UDP port number so that the receiver knows that the IP address 0 transmits the NRT service signaling channel data. This NRT service signaling channel data includes NST and NCT.

First, the receiver processes the PID of the NRT service signaling channel data corresponding to IP address 0. It is known that when the PID value is '0x64,' the IP address 1 corresponds to NRT service A and IP address 2 corresponds to NRT service B. Moreover, it is known that when the PID value is '0x65,' the IP address 3 corresponding to NRT service C is being signaled. The NRT services A, B, and C are transmitted from a channel having a same major and minor channel number.

The user, from the NRT service signaling channel indicated above, can select an NRT service from NRT service A, B, or C. Then the receiver checks the IP/UDP information of the NRT service from the NRT service signaling channel data and then checks through the NRT_IP_address_list_descriptor_A( ) as to which PID is being signaled from the selected IP/UDP information of the NRT service. The receiver, after checking the corresponding PID, processes the DSM-CC addressable section to process the IP packet or the IP datagram of the selected NRT service.

Figure 12:
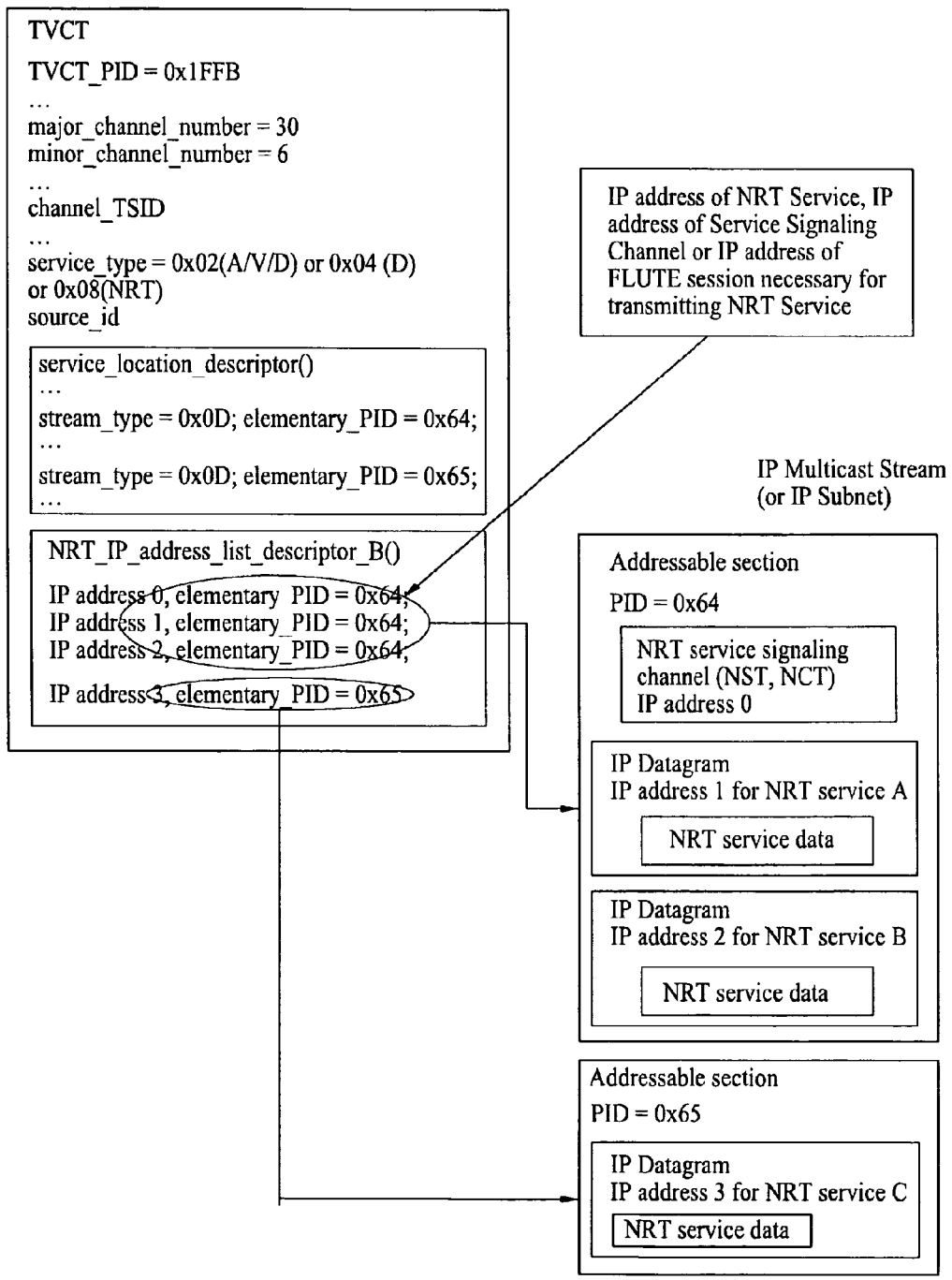
FIG. 12 is a diagram for an NRT service signaling structure configured according to another embodiment of the present invention.

FIG. 12 is an NRT structure configured for another embodiment of the present invention.

Instead of using the PMT as illustrated in FIG. 11, FIG. 12 illustrates how NRT service can be identified through the TVCT. As explained above, the TVCT is needed to identify the channel number, which includes the major channel and minor channel. Also, the TVCT further identifies whether the service type is NRT service or not, and by having the value '0x08' as its service_type, it means that it is an NRT service.

Since a transport stream has a bit stream type of enumeration of '0' and '1,' it is unable to know whether the transport stream is audio, video, or data. In such a case, it is able to identify the transport stream using the information within the service location descriptor as shown in FIG. 12. Here, the stream_type of '0x0D' indicates DSM-CC sections containing ATSC A/90 asynchronous data which refers to asynchronous carousel scenario of the DSM-CC download protocol encapsulated in DSM-CC sections as explained above.

In FIG. 12, the similar process will be applied for finding the NRT service signaling channel data as explained in the above FIG. 11. The elementary_PID having the value of '0x64' includes IP address 0, 1, and 2, and the elementary_PID having the value of '0x65' includes IP address 3 in the NRT_IP_address_descriptor_B( ).

The receiver processes the PID of the NRT service signaling channel data corresponding to IP address 0. It is known that when the PID value is '0x64,' the IP address 1 corresponds to NRT service A and IP address 2 corresponds to NRT service B. Moreover, it is known that when the PID value is '0x65,' the IP address 3 corresponding to NRT service C is being signaled. The NRT services A, B, and C are transmitted from a channel having a same major and minor channel number. The user, from the NRT service signaling channel, select an NRT service from NRT service A, B, or C. Then the receiver checks the IP/UDP information of the NRT service from the NRT service signaling channel data and then checks through the NRT_IP_address_list_descriptor_B( ) as to which PID is being signaled from the selected IP/UDP information of the NRT service. The receiver, after checking the corresponding PID, will process the DSM-CC addressable section to process the IP packet (datagram) of the selected NRT service.

FIG. 13. is a bit-stream syntax of a NRT_IP_address_list_descriptor_A( ) which is included in the PMT.

The NRT_IP_address_list_descriptor_A( ) includes information such as IP address and UDP port number to needed to locate the NRT service.

A descriptor_tag is an 8-bit field which identifies the descriptor as the AC-3 Audio Stream Descriptor.

A descriptor_length is an 8-bit field which indicates the length, in bytes, of the data to follow.

An NRT_IP_address_version_flag is a 1-bit field which indicates whether IP address information of FLUTE session for NRT service included in the NRT_IP_address_list_descriptor is an IPv4 address format or a IPv6 address format. In this section, '0' is set to indicate IPv4 and '1' to be IPv6.

An NRT_IP_address, a 32 or 128 bit field shall have the IP address of the Service Signaling Channel or IP address of the FLUTE session needed to transmit the NRT service.

An NRT_UDP_port_number, a 16-bit field indicating the UDP port number of the NRT service.

FIG. 14 is a bit-stream syntax of a NRT_IP_address_list_descriptor_B( ) which is included in the TVCT.

The NRT_IP_address_list_descriptor_B( ) includes information such as IP address and UDP port number to needed to locate the NRT service.

A descriptor_tag is an 8-bit field which identifies the descriptor as the AC-3 Audio Stream Descriptor.

A descriptor_length is an 8-bit field which indicates the length, in bytes, of the data to follow.

An NRT_IP_address_version_flag is a 1-bit field which indicates whether IP address information of FLUTE session for NRT service included in the NRT_IP_address_list_descriptor is a IPv4 address format or a IPv6 address format. In this section, '0' is set to indicate IPv4 and '1' to be IPv6.

An elementary_PID is a 13-bit filed which is the PID value of the TS packets carrying the program element being described in this iteration of the "for" loop.

An NRT_IP_address, a 32 or 128 bit field shall have the IP address of the Service Signaling Channel or IP address of the FLUTE session needed to transmit the NRT service.

An NRT_UDP_port_number, a 16-bit field indicating the UDP port number of the NRT service.

Figure 15:
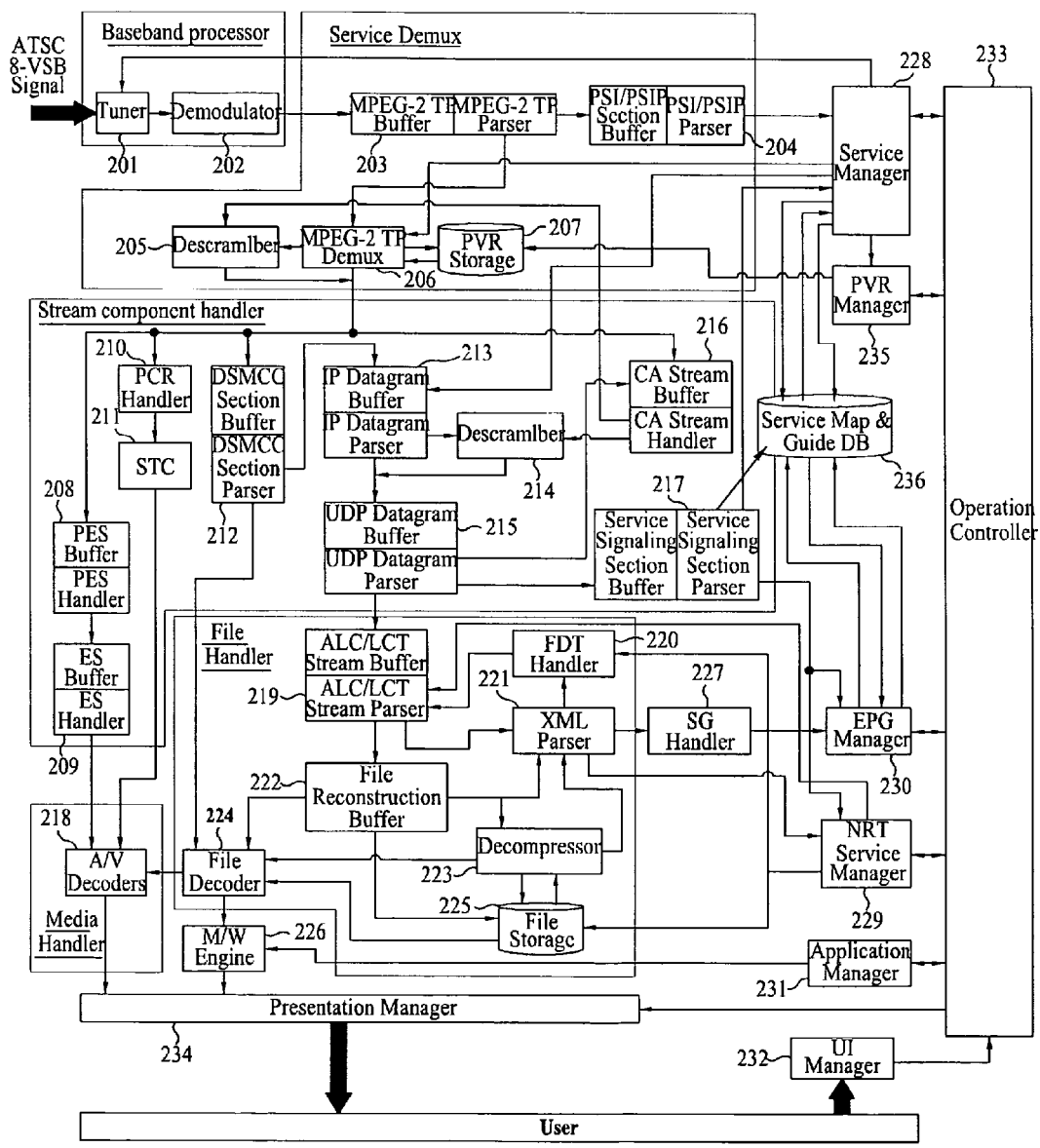
FIG. 15 is a block diagram of a receiving system according to an embodiment of the present invention.

FIG. 15 is a block diagram of a receiving system according to an embodiment of the present invention.

Figure 16:
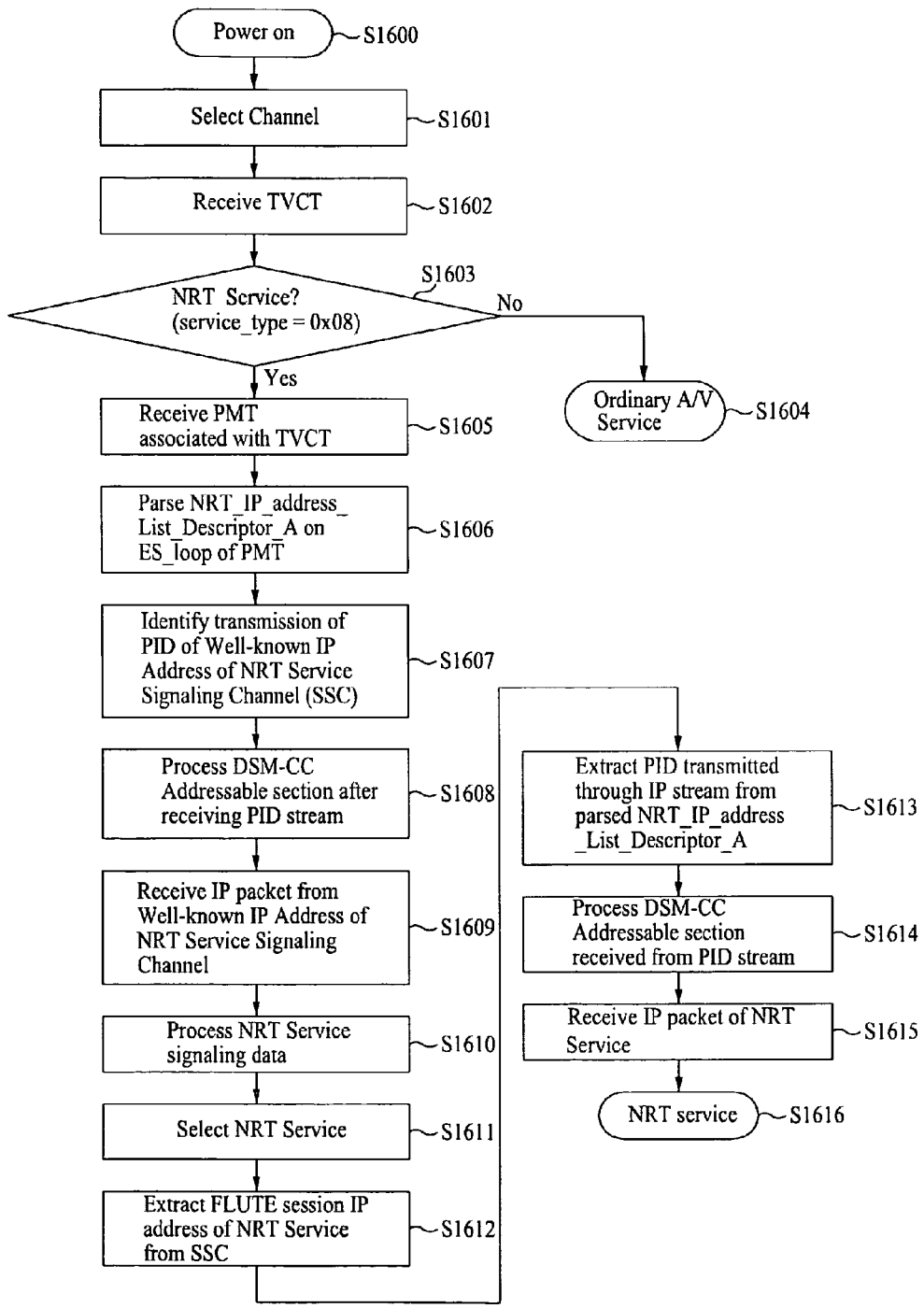
FIG. 16 is a flowchart to explain a process for processing an NRT service in a receiver according to an embodiment of the present invention.

Referring to FIG. 15, the receiving system mainly includes a baseband processor, an MPEG-2 service demultiplexer (demux), a stream component handler, a media handler, a file handler, and other parts. The units of the receiving system shown in FIG. 16 are explained in the following.

First of all, the baseband processor includes a tuner 201 and a vestigial side band (VSB) demodulator 202. The tuner 201 detects VSB radio frequency (RF) signal transmitted over the air and then extracts a symbol from the detected VSB RF signal. In this case, the tuner 201 is controlled by a service manager 228. The VSB demodulator 202 reconstructs meaningful data by demodulating the VSB symbol extracted by the tuner 201.

The MPEG-2 service demultiplexer includes an MPEG-2 TP buffer/parser 203, a program specific information/program and system information protocol (PSI/PSIP) section/buffer 204, a descrambler 205, an MPEG-2 TP demultiplexer (demux) 206 and a personal video recorder (PVR) storage 207.

The MPEG-2 TP buffer/parser 203 buffers and reconstructs the MPEG-2 TP carried on a VSB signal and then detects and processes a TP header.

The PSI/PSIP section/buffer 204 buffers and parses PSI/PSIP section data carried on an MPEG-2 TS. In this case, the parsed PSI/PSIP data (Program Map Table (PMT) and Terrestrial Virtual Channel Table (TVCT)) is collected by the service manager 228 and is then stored as a service map and guide data in a database. The NRT service is identified using the parsed PSI/PSIP data (PMT and TVCT).

The descrambler 205 reconstructs data of a payload for a scrambled packet payload in the MPEG-2 TP, using an encryption key or the like, delivered from a conditional access (CA) stream handler 216.

The MPEG-2 TP demultiplexer 206 filters an MPEG-2 TP varied on a VSB signal or a TP depending on the receiver that is to process among the MPEG-2 TP stored in the PVR storage 207 and then relays the filtered TP to a proper processing module. In this case, the MPEG-2 TP demultiplexer 206 can be controlled by the service manager 228 and the PVR manager 235.

The PVR storage 207 stores the received MPEG-2 TP using the VSB signal when requested by the end-user and outputs the MPEG-2 TP when requested by the end-user. In this case, the PVR storage 207 can be controlled by the PVR manager 235.

The stream component handler includes a packetized elementary stream (PES) buffer/handler 208, an elementary stream (ES) buffer/handler 209, a program clock reference (PCR) handler 210, a system time clock (STC) unit 211, a digital storage media command and control (DSM-CC) section buffer/handler 212 which receives the NRT Service Table (NST), an IP datagram buffer/header parser 213, an end-user datagram protocol (UDP) datagram buffer/handler 215, a CA stream buffer/handler 216 and a service signaling section buffer/handler 217.

The PES buffer/handler 208 buffers and reconstructs a PES carried on an MPEG-2 TS.

The ES buffer/handler 209 buffers and reconstructs an ES such as audio data, video data or the like, which is transmitted as a PES, and then delivers the reconstructed ES to a proper A/V decoder 218.

The PCR handler 210 handles PCR data used for time synchronization of audio and video streams or the like.

The STC unit 211 corrects a clock value of the A/V decoder 218 using a reference clock value delivered via the PCR handler 210 to enable time synchronization.

The DSM-CC section buffer/handler 212 buffers and handles DSM-CC section data for a file transmission via the MPEG-2 TP and an IP datagram encapsulation. An actual IP level transmission is carried out in a well-known IP address, such that the receiver can receive an IP level without separately acquiring IP connection information.

The IP datagram buffer/header parser 213 buffers and reconstructs an IP datagram, which is encapsulated via DSM-CC addressable section and is then carried on an MPEG-2 TP. The IP datagram buffer/header parser 213 parses a header of each IP datagram through the reconstruction. In this case, the IP datagram buffer/header parser 213 is controlled by the service manager 228. The IP datagram buffer 213, the UDP datagram buffer 215, and the service signaling section parser 217 receives and processes the NRT Content Table (NCT) and NRT Service Table (NST) from the ATSC 8-VSB signal. The NCT and NST are transmitted through well-known IP address number and UDP port number.

If scrambling is applied to a payload in the received IP datagram, the descrambler 214 reconstructs data of the payload using an encryption key for the payload delivered from the CA stream handler 216.

The UDP datagram buffer/handler 215 buffers and reconstructs a UDP datagram carried on an IP datagram and also parses and processes a UDP header.

The CA stream buffer/handler 216 buffers and handles such data as a key value for descrambling, for example, an entitlement management message (EMM) transmitted for a conditional access function carried on an MPEG-2 TS or an IP stream, an entitlement control message (ECM). In this case, an output of the CA stream buffer/handler 216 is delivered to the descrambler 214 to perform a decryption operation of an MPEG-2 TP or an IP datagram that carries AV data, file data and the like.

The service signaling section buffer/parser 217 processes a signaling information like an NRT Service Table (NST), an NRT Content Table (NCT) and descriptors related to the NST or the NCT for signaling an NRT service. The processed signaling information is transferred to the NRT service manager 229.

The PSI/PSIP Section Buffer and PSI/PSIP Parser 204 parse the TVCT and the PMT according to the present invention. The Service Manager 228 controls the parsed TVCT and PMT to look for the IP address and the UDP port number of the corresponding Addressable section by looking at the NRT_IP_address_list_descriptor within the TVCT and the PMT. The Service Manager 228 checks PID having the NRT service signaling channel. And then, from the NST or the NCT processed by the above buffer/parser 217 and the NRT Service Manager 229, the NRT service data in the File Storage 225 is then processed and stored.

The media handler includes A/V decoders 218.

The AV decoders 218 decode compressions of audio and video data delivered via the ES handler 209 and then processes the decoded data, which are to be presented to an end-user.

The file handler includes an Asynchronous Layered Coding/Layered Coding Transport (ALC/LCT) buffer/parser 219, a file description table (FDT) handler 220, an extensible markup language (XML) parser 221, a file reconstruction buffer 222 and a decompressor 223.

The ALC/LCT buffer/parser 219 buffers and reconstructs ALC/LCT data carried on UDP/IP stream and then parses a header of ALC/LCT and a header extension thereof. In this case, the ALC/LCT buffer/parser 219 can be controlled by the NRT service manager 229.

The FDT handler 220 parses and processes a FDT of a File Delivery over Unidirectional Transport (FLUTE) protocol transmitted via an ALC/LCT session. It is able to transfer the processed FDT to the NRT service manager 229. The FDT handler 220 can also be controlled by the NRT service manager 229.

The XML parser 221 parses an XML document transmitted via the ALC/LCT session and then delivers the parsed data to such a proper module as the FDT handler 220, the SG handler 227 and the like.

The file reconstruction buffer 222 reconstructs a file transferred to the ALC/LCT and FLUTE session.

If the file transferred to the ALC/LCT and FLUTE session is compressed, the decompressor 223 performs a process for decompressing the compression.

The file decoder 224 decodes a file reconstructed by the file reconstruction buffer, a file decompressed by the decompressor 223, or a file extracted from the file storage 225.

The file storage 225 stores and extracts the received file. In this case, the received file may contain NRT content.

Finally, the remaining parts, not explained above, will be explained as follows.

A middleware (M/W) engine 226 processes data of a file that is not an AV stream transferred via a DSM-CC section or an IP diagram, and then delivers the processed data to the presentation manager 234.

The SG handler 227 collects and parses service guide data transferred in an XML document format and then delivers the parsed data to the EPG manager 230.

As explained above, the service manager 228 produces a service map by collecting and parsing the PSI/PSIP data carried on MPEG-2 TS and service signaling section data carried on an IP stream and then controls an access to a service specified by an end-user by storing the service map in a service map & guide database. In this case, the service manager 228 is controlled by an operation controller 233 and then controls the tuner 201, the MPEG-2 TP demultiplexer 206, the IP datagram buffer/handler 213, and the NRT service manager 229.

The NRT service manager 229 performs overall managements on the NRT service transferred in an object/file format via FLUTE session on an IP layer. The NRT service manager 229 parses the signaling information transferred from the service signaling section buffer/parser 217. And, the parsed signaling information is transferred to the service map & guide database 236 to be stored therein. Moreover, the NRT service manager 229 controls NCT information, which correspond to contents related to a service guide in the signaling information, to be transferred to the EPG manager 230, thereby forming EPG data. In this case, the NRT service manager 229 controls the FDT handler 220, the file storage 225 and the like. Therefore, the NRT service manager 229 receives the FDT from the FDT handler 220, parses the received FDT and then controls received NRT contents to be stored as a hierarchical structure in the file storage 225. And, the NRT service manager 229 controls the corresponding NRT contents to be extracted from the file storage 225 in case that a user makes a selection for the NRT service.

The EPG manager 230 receives the service guide data from the SG handler 227, configures EPG data, and then controls the EPG data to be displayed. The EPG manager 230 will configure the service guide information and UI manager 232 will display the NRT service guide to end-user based on the defined NCT fields.

The application manager 231 performs overall managements on processing of application data transferred in such a format as an object, a file and the like.

The user interface (UI) manager 232 delivers an input of a user via a UI to the operation controller 233 and enables an operation of a process for a user-requested service to be initiated.

The operation controller 233 processes a user's command delivered via the UI manager 232 and then enables a manager of a necessary module to perform a corresponding action.

And, the presentation manager 234 provides at least one of A/V data outputted from the A/V decoder 218, file data outputted the middleware (M/W) engine 226 and EPG data outputted from the EPG manager 230 to user via speaker and/or screen.

FIGS. 16 and 17 are flowcharts illustrating the process of how an NRT service is transmitted through ATSC broadcasting system.

FIG. 16 is a flowchart indicating the process of an NRT service transmitted using PMT and NRT_IP_address_list_descriptor_A.

First of all, the receiver is turned on for operation [S1600]. Then the channel is selected [S1601]. The TVCT is received [S1602].

An NRT service is identified in the TVCT by checking the service_type. If the service_type has a value of '0x08,' it is an NRT service [1603].

If NRT service is identified in the above step, the receiver processes the NRT service, but if there is no NRT service associated, then the receiver processes as an ordinary A/V service [S1604].

Next, the receiver receives a PMT associated with the TVCT [S1605].

Then, the receiver parses the NRT_IP_address_List_Descriptor_A in ES_loop of the PMT [S1606].

The receiver identifies a PID that is transmitted through a Well-known IP address for the NRT Service Signaling Channel (SSC) [S1607].

Then the receiver processes the DSM-CC addressable section after receiving the PID stream [S1608].

Next, the receiver receives the IP packet from the Well-known IP address of the NRT Service Signaling Channel (SSC) [S1609].

The receiver then processes the NRT service signaling data (NST/NCT) [S1610].

The NRT service is then selected by the NRT SSC [S1611].

From the NRT SSC, the receiver extracts the FLUTE session IP address of the selected NRT service [S1612].

Then the receiver extracts the PID transmitted through IP stream from the parsed NRT_IP_address_List_Descriptor_A for selected NRT service [S1613].

The receiver processes DSM-CC addressable section received from the PID stream [S1614].

Finally, the receiver receives the IP packet of the NRT service [S1615]. Thus, NRT service is received [S1616].

Similar to FIG. 16, but FIG. 17 describes the process of a receiver receiving an NRT service using TVCT and NRT_IP_address_list_descriptor_B according to another embodiment of the present invention.

The receiver is turned on for operation [S1700]. Then the channel is selected [S1701]. After selecting the channel, TVCT is received [S1702].

An NRT service is identified in the TVCT by checking the service_type. If the service_type has a value of '0x08,' it is an NRT service [1703].

If NRT service is identified in the above step, the receiver processes the NRT service, but if there is no NRT service associated, then the receiver processes as an ordinary A/V service [S1704].

If the TVCT includes an NRT service, the receiver parses the NRT_IP_address_List_Descriptor_B of the TVCT [S1705].

The receiver identifies the PID transmitted through a Well-known IP address from the NRT Service Signaling Channel (SSC) [S1706].

Then the receiver processes the DSM-CC addressable section after receiving the PID stream [S1707].

Next, the receiver receives the IP packet from the Well-known IP address of the NRT Service Signaling Channel (SSC) [S1708].

The receiver then processes the NRT service signaling data [S1709].

The NRT service is selected by the NRT SSC [S1710].

From the NRT SSC, the receiver extracts the FLUTE session IP address [S1711].

Then the receiver extracts the PID transmitted through IP stream from the parsed NRT_IP_address_List_Descriptor_B [S1712].

The receiver processes DSM-CC addressable section received from the PID stream [S1713].

Finally, the receiver receives the IP packet of the NRT service [S1714]. Thus, NRT service is received [S1715].

To reiterate the process, the receiver receives a broadcast signal including a Non-Real-Time (NRT) service. The NRT service is identified based on the broadcast signal by identifying it through the TVCT. From the TVCT or the PMT, the receiver parses the NRT_IP_address_list_descriptor. Then the receiver identifies the PID of a Well-known IP address from the NRT Service Signaling Channel (SSC). After processing the NRT SSC, a user selects an NRT service. The selected NRT service is carried by IP address/UDP port number. So the receiver finds a PID of the IP address/UDP port number of the selected NRT service through the parsed NRT_IP_address_list_descriptor. Then the receiver processes the DSM-CC addressable section from the received PID stream. Finally, IP packet of the NRT service is received.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a broadcast signal for a Non-Real-Time (NRT) service, the method comprising:
   receiving, by a baseband processor, a broadcast signal including first signaling information and second signaling information for the NRT service through a Service Signaling Channel (SSC) with a specific IP address, the NRT service which is delivered in advance of its use and stored in a receiving device;
   identifying, by a service manager, the NRT service based on the first signaling information;
   acquiring, by the service manager, an IP address of an NRT service data based on the second signaling information; and
   downloading, by an NRT service manager, a desired NRT service based on the acquired IP address of the NRT service data, wherein:
   the NRT service is delivered within IP packets,
   the IP packets are carried in Digital Storage Media Command and Control (DSM-CC) Addressable Sections in MPEG-2 Transport Stream and the DSM-CC Addressable Sections are referenced by a Virtual Channel Table (VCT) or an associated Program Map Table (PMT),
   the IP packets form an IP subnet, and
   the PMT includes information for accessing the SSC, wherein the SSC is contained in the IP subnet.

2. The method of claim 1, wherein the first signaling information is a service_type field identifying the NRT service.

3. The method of claim 2, wherein the first signaling information and second signaling information for the NRT service through the SSC is included in a Service Map Table (SMT), the SMT containing service-level attributes for the NRT service.

4. The method of claim 3, wherein the broadcast signal further includes an NRT Information Table (NRT-IT) describing one or more content items available for download to storage in the receiving device for signaling NRT service.

5. The method of claim 4, wherein the content item is composed of one or more files being delivered via a File Delivery over Unidirectional Transport (FLUTE) file delivery session,
   wherein the NRT-IT includes linkage information for linking from the content item to one or more files, the linkage information having an identifier of the content item, the identifier of the content item being used to map one or more files to the content item with a content identifier included in a FLUTE File Description Table (FDT) instance for the non-real time service.

6. A broadcast receiver for receiving a broadcast signal including a Non-Real Time (NRT) service, the broadcast receiver comprising:
   a baseband processor for receiving a broadcast signal including first signaling information and second signaling information for the NRT service through a Service Signaling Channel (SSC) with a specific IP address, the NRT service which is delivered in advance of its use and stored in a receiving device;
   a Service Manager for identifying the NRT service based on the first signaling information and acquiring an Internet Protocol (IP) address of an NRT service data based on the second signaling information; and
   an NRT service manager for downloading a desired NRT service based on the acquired IP address of the NRT service data, wherein:

the NRT service is delivered within IP packets, the IP packets are carried in Digital Storage Media Command and Control (DSM-CC) Addressable Sections in MPEG-2 Transport Stream and the DSM-CC Addressable Sections are referenced by a Virtual Channel Table (VCT) or an associated Program Map Table (PMT), the IP packets form an IP subnet, and the PMT includes information for accessing the SSC, wherein the SSC is contained in the IP subnet.

7. The broadcast receiver of claim 6, wherein the first signaling information is a service type field identifying the NRT service.

8. The broadcast receiver of claim 7, wherein the first signaling information and second information for the NRT service through the SSC is included in a Service Map Table (SMT), the SMT containing service-level attributes for the NRT service.

9. The method of claim 8, wherein the broadcast signal further includes an NRT Information Table (NRT-IT) describing one or more content items available for download to storage in the receiving device for signaling NRT service.

10. The method of claim 9, wherein the content item is composed of one or more files being delivered via a File Delivery over Unidirectional Transport (FLUTE) file delivery session, wherein the NRT-IT includes linkage information for linking from the content item to one or more files, the linkage information having an identifier of the content item, the identifier of the content item being used to map one or more files to the content item with a content identifier included in a FLUTE File Description Table (FDT) instance for the non-real time service.

* * * * *